US009587608B2

(12) United States Patent
Jeannel et al.

(10) Patent No.: US 9,587,608 B2
(45) Date of Patent: Mar. 7, 2017

(54) VALVE FOR A FLOWING FLUID

(75) Inventors: Laurent Jeannel, Leonberg-Hoefingen (DE); Kerstin Koch, Schwieberdingen (DE); Franz Thoemmes, Bietigheim-Bissingen (DE); Martin Stahl, Remseck (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/239,086

(22) PCT Filed: Jul. 5, 2012

(86) PCT No.: PCT/EP2012/063075
§ 371 (c)(1),
(2), (4) Date: May 16, 2014

(87) PCT Pub. No.: WO2013/023838
PCT Pub. Date: Feb. 21, 2013

(65) Prior Publication Data
US 2014/0252132 A1  Sep. 11, 2014

(30) Foreign Application Priority Data

Aug. 18, 2011  (DE) .................. 10 2011 081 175
Jul. 4, 2012  (DE) .................. 10 2012 211 665

(51) Int. Cl.
*F02M 61/16* (2006.01)
*F02M 61/18* (2006.01)
(Continued)

(52) U.S. Cl.
CPC ......... *F02M 61/163* (2013.01); *B05B 1/3436* (2013.01); *B05B 1/3463* (2013.01);
(Continued)

(58) Field of Classification Search
CPC ............... F02M 61/162; F02M 61/163; F02M 61/1806; F02M 61/1846; F02M 61/1853; F02M 61/186
See application file for complete search history.

(56) References Cited

U.S. PATENT DOCUMENTS 6,170,763 B1 *  1/2001  Fuchs et al. ............. 239/533.12
6,405,945 B1 *  6/2002  Dobrin ......................... 239/463
(Continued)

FOREIGN PATENT DOCUMENTS

DE          38 08 396        9/1989
DE          195 27 049       1/1997
(Continued)

OTHER PUBLICATIONS

International Search Report for PCT/EP2012/063075, dated Jan. 3, 2013.

*Primary Examiner* — Ryan Reis
(74) *Attorney, Agent, or Firm* — Gerard Messina

(57) ABSTRACT

A metering valve or an injector includes: a valve-seat member which closes a valve chamber and has a central valve opening, and a spray orifice disk downstream from the valve-seat member in the flow direction of the fluid, which has at least one spray orifice. The spray orifice disk has a swirl chamber concentric with the spray orifice and at least one swirl duct leading from the swirl chamber to beneath the valve opening, and the swirl chamber and swirl duct are integrally formed as recesses into the disk surface of the spray orifice disk facing the valve body. The swirl duct has a duct cross section and the spray orifice has an orifice cross section such that the ratio of the duct cross section to the orifice cross section is equal to or greater than 1.5.

14 Claims, 3 Drawing Sheets

(51) Int. Cl.
 *B05B 1/34* (2006.01)
 *F01N 3/20* (2006.01)
(52) U.S. Cl.
 CPC ......... *F01N 3/2066* (2013.01); *F02M 61/162* (2013.01); *F02M 61/1853* (2013.01); *F01N 2610/02* (2013.01); *F01N 2610/1453* (2013.01); *F02M 61/1833* (2013.01); *F02M 61/1846* (2013.01); *Y02T 10/24* (2013.01)

(56) References Cited

U.S. PATENT DOCUMENTS

| 2003/0234005 A1* | 12/2003 | Sumisha et al. | 123/467 |
| 2004/0144870 A1* | 7/2004 | Tani et al. | 239/585.1 |
| 2005/0284965 A1* | 12/2005 | Schneider | 239/533.12 |
| 2006/0097087 A1* | 5/2006 | Goenka et al. | 239/596 |
| 2011/0233307 A1* | 9/2011 | Ohno et al. | 239/463 |

FOREIGN PATENT DOCUMENTS

| DE | 100 48 935 | 4/2002 |
| DE | 10 2012 201187 | 8/2012 |
| JP | H10507240 A | 7/1998 |
| JP | H11-324868 A | 11/1999 |
| JP | 2000508739 A | 7/2000 |
| JP | 2001-300360 A | 10/2001 |
| JP | 2002098028 A | 4/2002 |
| JP | 2003336561 A | 11/2003 |
| JP | 2004-176690 A | 6/2004 |
| JP | 3784748 B2 | 6/2006 |
| JP | 4089915 B2 | 5/2008 |
| JP | 2008280981 A | 11/2008 |
| JP | 2009-156129 A | 7/2009 |
| JP | 4310402 B2 | 8/2009 |
| JP | 4510804 B2 | 7/2010 |
| JP | 2012029347 A | 2/2012 |
| RU | 2151905 C1 | 6/2000 |

* cited by examiner

VALVE FOR A FLOWING FLUID

BACKGROUND OF THE INVENTION

1. Field of the Invention

The present invention relates to a valve for a flowing fluid, in particular a metering valve or an injector for internal combustion engines.

2. Description of the Related Art

In a known fuel injector for internal combustion engines (published German patent application document DE 195 27 049 A1), the valve-seat member having a valve opening and a valve seat is situated in a tubular valve seat support offset relative to the free end of this support and delimits the valve chamber of the valve together with this valve seat support. An atomizing device which is inserted into the valve seat support and is situated downstream from the valve opening in the flow direction of the fluid includes a bowl-shaped spray orifice disk having a bowl base and a bowl edge. The bowl base is seated on the flat free end face of the free valve-seat member in a planar manner, and the bowl edge is supported on the valve seat support. The spray orifice disk is fixedly connected both to the valve seat support and to the valve-seat member by a circumferential weld seam on the bowl edge and by an annular weld seam in the bowl base. Four spray orifices are located in the central region of the bowl base which coincides with the valve opening, the orifices being situated on a hole circle having a circle center coaxial with the valve opening. The spray orifices are produced with the aid of spark erosion or stamping and may be run perpendicularly or obliquely through the bowl base.

A known fuel injector for fuel injection systems of internal combustion engines, in particular for directly injecting fuel into a combustion chamber of an internal combustion engine (published German patent application document DE 100 48 935 A1), includes a valve member which may be operated by an actuator and which cooperates with a valve seat formed on a valve-seat member and surrounding a valve opening in order to open and close the valve. A disk-shaped swirl element, which is also referred to as a spray orifice disk, is situated downstream from the valve seat and has an intake region communicating with the valve opening and multiple outlet openings, also referred to as spray orifices. The spray orifices are situated centrally in each swirl chamber. A swirl duct runs from the intake region to each swirl chamber and opens tangentially into the same, so that the fuel flowing from the intake region to the swirl chambers flows asymmetrically against the swirl chambers. The swirl element is made of sheet metal, the opening structures of the intake region, swirl ducts and swirl chambers being introduced with the aid of stamping, embossing, spark eroding or laser drilling. Due to the swirl element, good atomization of the fuel spray-discharged with high pressure is achieved.

BRIEF SUMMARY OF THE INVENTION

The valve according to the present invention has the advantage that swirling of the fluid is achieved with the aid of the swirl chamber and swirl duct in the spray orifice disk, which assures that the fluid is spray-discharged as a finely atomized spray. By varying the ratios of the cross section of the swirl duct to the orifice cross section and orifice geometry, the swirl may be adjusted in such a way that narrower and wider individual jets, also referred to as spray lamellae, are created in the spray. In addition, the spray angle and spray shape may be influenced. The ratio variables of the duct cross section to the orifice cross section are used to optimize the fluid processing during metered spraying with respect to desired small spray angles and high atomization quality at average fluid pressures, such as in the intake manifold injection in gasoline engines, in so-called DNOX systems for the metered spray-discharge of a urea-water solution into the exhaust gas of an internal combustion engine, or in heating oil burners. With the aid of this described coordination of the cross-sectional dimensions of the swirl duct and spray orifice with respect to each other, it is achieved that the swirl intensity impressed onto the fluid as it passes through the swirl chamber and spray orifice is as small as possible in order to obtain small spray angles, and as large as necessary to achieve the high atomization quality.

The spray orifice disk, the processing quality of which is considerably improved, may be used in valves that are already in production without modifying the valve concept and may be attached to the valves with the customary joining methods, e.g., welding, the different modifications to the spray orifice disk allowing a scope of variants to be kept available with respect to spray angles, static flow rate, and spray width and spray shape of the desired fluid spray-discharge for the valves. With the valve according to the present invention, a space-saving design of effective swirl atomization with minimum dead volume behind the valve seat is achieved, which is cost-effectively integrated into a single spray orifice disk. The spray orifice disk may be designed as a multi-orifice or single-orifice disk for this purpose.

According to one preferred specific embodiment of the present invention, the swirl chamber has an axial chamber depth and a chamber diameter which are dimensioned in such a way that the ratio of the chamber depth to the chamber diameter has a lower limiting value of 0.2 and an upper limiting value of 0.6, and may assume any value in between. As an alternative or in addition, the spray orifice has an orifice length and an orifice diameter which are dimensioned in such a way that the ratio of the orifice length to the orifice diameter covers a value range, the lower limit of which is 0.2 and the upper limit of which is 0.6. Both measures allow the swirl intensity to be additionally influenced in a targeted manner to achieve further improvement of the atomization quality.

According to one preferred specific embodiment of the present invention, the outer surface of the valve-seat member facing away from the valve chamber is designed to be flat or planar, and the spray orifice disk rests directly against the outer surface of the valve-seat member. The flat valve-seat member outer surface thus advantageously forms a cover for recesses in the spray orifice disk which form the swirl chamber and swirl duct.

If the flatness of the valve-seat member outer surface is not sufficient, according to one advantageous specific embodiment of the present invention a compensating disk is situated between the spray orifice disk and the valve-seat member, the compensating disk having a flat or planar disk surface resting against the spray orifice disk and a central hole coaxial with the valve opening, and the disk covering the recesses for the swirl duct and swirl chamber in the spray orifice disk. Both disks are then externally calibrated and joined with respect to the disk surfaces thereof situated on top of each other, so that faulty incident flows of the swirl chambers and swirl ducts due to gaps in the covering of the recesses for the swirl chamber and swirl duct are prevented.

According to one advantageous specific embodiment of the present invention, the spray orifice disk has a disk thickness in the range of 0.15 mm to 0.25 mm. This low disk thickness has the advantage that the length of the at least one spray orifice is small, whereby only low frictional losses arise in the spray orifice and thus losses in the swirl intensity of the fluid in the spray orifice remain low. Due to its low thickness, the spray or disk made of stainless steel is thus suited for full penetration welding and may be easily welded to the valve-seat member, without any noteworthy deformation occurring on the valve-seat member. The tightness of the valve is thus not adversely affected by welding on the spray orifice disk. The spray orifice disk may be easily implemented in conventional valves, without increasing the overall length of the valves. The annular land molded thereon in one piece results in a cup- or bowl-like shape of the spray orifice disk, which assures sufficient stability and allows alternative welding to the valve seat support with the aid of full penetration welding of the thin bowl edge or the thin bowl base. Similarly good stability of the thin spray orifice disk is also achieved by joining the same with the compensating disk.

According to one advantageous specific embodiment of the present invention, the integral forming of the swirl chamber and swirl duct into the disk surface is carried out with the aid of embossing or by material ablation with the aid of spark erosion, etching or ultrashort laser pulses. In all manufacturing types, the swirl may be adjusted by varying the ratio of the duct cross section to the orifice cross section and orifice geometry in such a way that narrow and wide individual jets or fluid lamellae arise in the fluid spray. The at least one spray orifice may also be designed cylindrically or conically, having an increasing cross section in the flow direction and an orifice axis extending perpendicularly or obliquely to the disk surface.

According to one advantageous specific embodiment of the present invention, the swirl duct includes an inflow region leading away from the valve opening and an incident flow region opening into the swirl chamber, the incident flow region being positioned in assignment to the swirl chamber in such a way that the fluid flows tangentially into the swirl chamber. The spray orifice thus experiences lateral incident flow via the swirl duct, and swirl is thus generated in the swirl chamber resulting, via the at least one spray orifice, in very fine atomization of the spray with the aid of one or more fluid lamellae.

According to one advantageous specific embodiment of the present invention, the width of the swirl duct tapers in the inflow region in the flow direction and is preferably constant in the incident flow region. This minimizes restriction of the fluid in the swirl duct, or allows the same to be adjusted very precisely.

According to one advantageous specific embodiment of the present invention, the swirl duct has an outer duct side wall at least in the incident flow region, which is tangentially guided to the wall of the swirl chamber, and an inner duct side wall which is located opposite the outer duct side wall and has such a distance from the same that an imaginary vanishing line of the inner duct side wall extends through the spray orifice. These design measures maximally lower the swirl intensity, which facilitates the optimization of the swirl intensity in particular at higher fluid pressures in the swirl ducts.

According to one advantageous specific embodiment of the present invention, multiple spray orifices are situated on a circle which is concentric with the valve opening at equal distances from each other, and the number of spray orifices present corresponds to the number of swirl ducts, which are situated in a star-shaped manner with respect to the valve opening having the star point located beneath the valve opening. In this way, a multi-orifice disk having good atomizing quality may advantageously be implemented. The spray orifice disk is preferably provided with two to six spray orifices as a function of the application purpose.

According to one advantageous specific embodiment of the present invention, a single spray orifice is present in the spray orifice disk, this orifice being situated at a radial distance from the valve opening. Two curved swirl ducts are guided from the valve opening to the swirl chamber surrounding the spray orifice and are situated laterally reversed from each other in the spray orifice disk. Such a single-orifice variant of the spray orifice disk allows particularly small static flow rates to be obtained with very good atomization of the fluid. Due to the incident flow of the swirl chamber via the two curved swirl ducts, the duct widths of which again advantageously taper in the inflow region in the flow direction and are preferably at least approximately constant in the incident flow region, uniform swirl may build up.

DETAILED DESCRIPTION OF THE INVENTION

Figure 1:
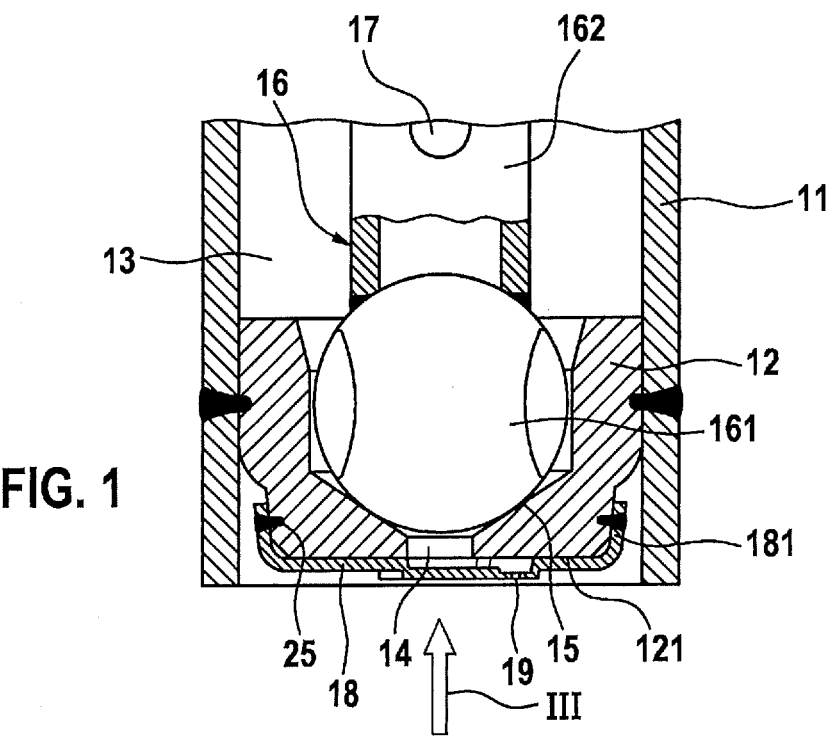
FIG. 1 shows a section of a longitudinal section of a valve for a fluid having a valve-seat member and a spray orifice disk downstream from the valve-seat member in the flow direction.

The valve for a flowing fluid, a section of the end of which on the fluid discharge side is shown in FIG. 1, is used, e.g., as an injector for injecting fuel in fuel injection systems of internal combustion engines, or for the metered injection of liquids, such as urea-water solutions, into the exhaust tract of internal combustion engines for the purpose of after-treatment of the exhaust gas, but is also advantageously applied in heating oil burners of heating systems. The valve has a sleeve-shaped valve seat support 11 which forms part of a valve housing and which is closed off with a valve-seat member 12. A valve opening 14 and a valve seat 15 surrounding valve opening 14 are formed in valve-seat member 12, which together with valve seat support 11 delimits a valve chamber 13. For closing and unblocking valve opening 14, valve seat. 15 cooperates with a spherical closing head 161 of a valve member 16, the head being attached, e.g., welded, to the end of a hollow valve needle 162 facing valve-seat member 12. The fluid is supplied to valve chamber 13 via hollow valve needle 162 of valve member 16, for which purpose at least one through-hole 17 is provided in valve needle 162. Together with closing head 161, valve seat 15 forms a seal seat which is acted upon by the fluid volume pressurized with the system pressure in valve chamber 13. To close valve opening 14, closing head 161 is pressed onto valve seat 15 by a valve closing spring, which is not shown here, engaging on valve needle 162. Valve opening 14 is unblocked in that closing head 161 lifts off valve seat 15 against the restoring force of the valve closing spring and is achieved in the known manner with the aid of an electromagnetic, piezo-ceramic or magnetorestrictive actuator engaging on valve needle 162.

Figure 2:
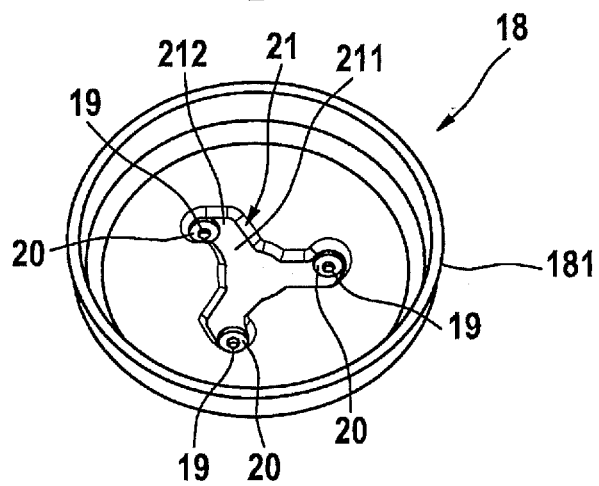
FIG. 2 shows a perspective illustration of a top view onto the spray orifice disk.
Figure 3:
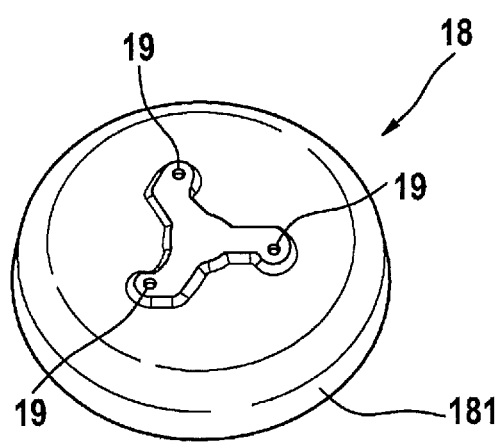
FIG. 3 shows a perspective illustration of a bottom view onto the spray orifice disk in the direction of arrow III in FIG. 1.

In the flow direction of the fluid, an atomizing or spray orifice disk 18 having at least one spray orifice 19 is provided downstream from valve opening 14. In the exemplary embodiment of spray orifice disk 18 according to FIGS. 1 through 3, multiple spray orifices 19, here three, are situated on a circle which is concentric with valve opening 14 at equal distances from each other. In assignment to spray orifice 19, spray orifice disk 18 includes a swirl chamber 20 which is concentric with spray orifice 19 and a swirl duct 21 leading from swirl chamber 20 to beneath valve opening 14, so that in the exemplary embodiment of spray orifice disk 19 according to FIGS. 1 through 3 the number of swirl chambers 20 and swirl ducts 21 corresponds to the number of spray orifices 19. Swirl ducts 21 are situated in a star-shaped manner, the star point being located beneath valve opening 14. Swirl chambers 20 and swirl ducts 21 are integrally formed as recesses into the disk surface of spray orifice disk 18 facing valve-seat member 12. This integral forming is carried out with the aid of embossing or by material ablation with the aid of spark erosion, etching or ultrashort laser pulses. Spray orifices 19 penetrating spray orifice disk 18 are also introduced with the aid of the same methods or by stamping, spray orifices 19 having a cylindrical shape or truncated cone shape with increasing diameter or cross section in the flow direction as a function of the desired influencing of the fluid exiting spray orifices 19, and the spray orifice axes extending parallel to the axis of spray orifice disk 18 or inclined thereto, or at a right or acute angle to the disk surface.

Figure 4:
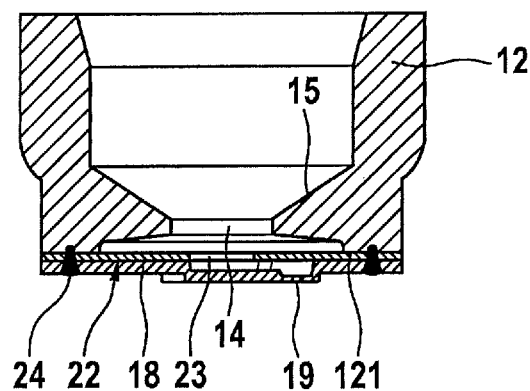
FIG. 4 shows a longitudinal section of a modified valve-seat member having a spray orifice disk and a compensating disk.
Figure 5:
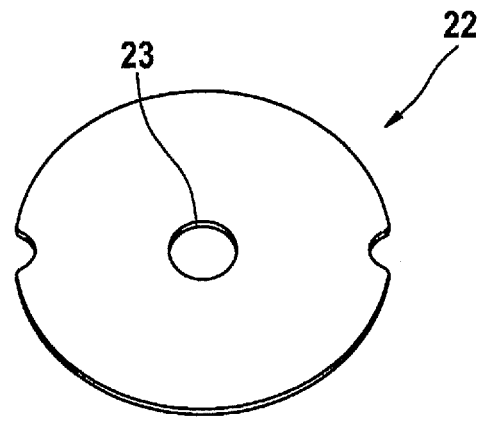
FIG. 5 shows a perspective illustration of a top view onto the compensating disk in FIG. 4.
Figure 6:
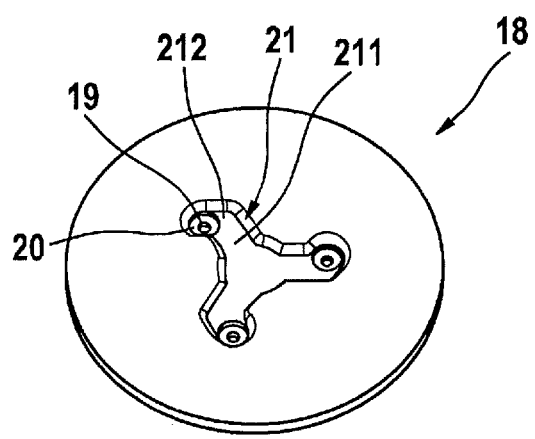
FIG. 6 shows a perspective illustration of a to view onto the spray orifice disk in FIG. 4.

Each swirl duct 21 has an inflow region 211 leading away from valve opening 14 and an incident flow region 212 opening into swirl chamber 20. In assignment to swirl chamber 20, incident flow region 212 is situated in such a way that the fluid flows tangentially into swirl chamber 20. To minimize restriction of the fluid in swirl duct 21, or to be able to adjust it very precisely, the duct width in inflow region 211 tapers, while it is largely constant in incident flow region 212. To implement the tangential inflow of the fluid into swirl chamber 20 in the exemplary embodiment of spray orifice disk 18 according to FIGS. 1 through 3 with the star-shaped arrangement of swirl ducts 21, incident flow region 211 of swirl ducts 21 is angled relative to inflow region 212. As is shown in FIG. 1, spray orifice disk 18 is placed against the free, flat and planar outer surface 121 of valve-seat member 12, so that flat outer surface 121 of valve-seat member 12 covers the recesses forming swirl chamber 20 and swirl duct 21. If outer surface 121 of valve-seat member 12 is not sufficiently planar, a compensating disk 22 is situated between valve-seat member 12 and spray orifice disk 18, as is shown in the exemplary embodiment of FIGS. 4 through 6, this compensating disk having a central hole 23 coaxial with valve opening 14 which covers the recesses of swirl chamber 20 and swirl duct 21, instead of outer surface 121 of valve-seat member 12. Compensating disk 23 and spray orifice disk 18 are calibrated externally and then placed onto valve-seat member 12 and attached thereto, as is indicated in FIG. 4 by circumferential weld seam 24. In the exemplary embodiment of spray orifice disk 18 according to FIGS. 1 through 3, spray orifice disk 18 is provided with an annular land 181 molded thereon in one piece and extending circumferentially at the edge, so that the disk has a cup or bowl shape. The annular land, or cup or bowl edge, extends over valve-seat member 12 in a form-locked manner and is welded onto valve-seat member 12 with the aid of full penetration welding, as is indicated by weld seam 25 drawn in FIG. 1. However, as an alternative, spray orifice disk 18 may also be attached with the aid of full penetration welding in the cup or bowl base and joined to valve-seat member 12. In both exemplary embodiments of spray orifice disk 18 according to FIGS. 1 through 3 and according to FIGS. 4 through 6, spray orifice disk 18 is extremely thin and produced from stainless steel. The disk thickness thereof is only 0.15 mm to 0.25 mm.

Figure 7:
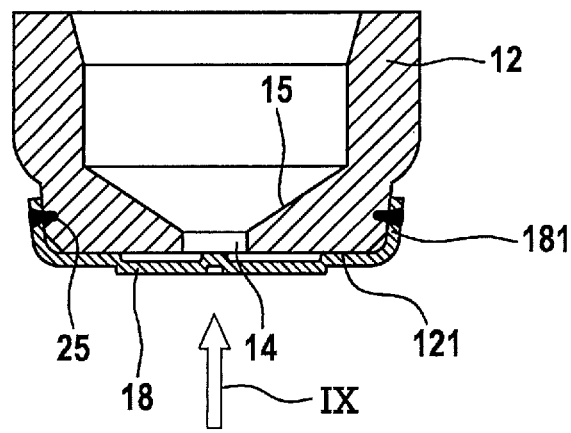
FIG. 7 shows a longitudinal section of a valve-seat member having a downstream spray orifice disk in the flow direction according to a further exemplary embodiment.
Figure 8:
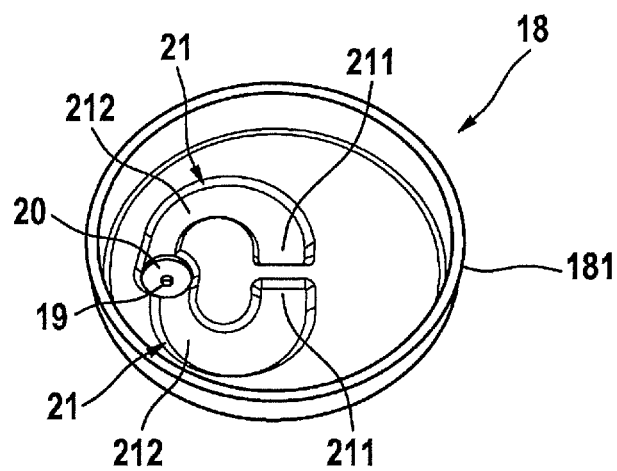
FIG. 8 shows a perspective illustration of a top view onto the spray orifice disk in FIG. 7.
Figure 9:
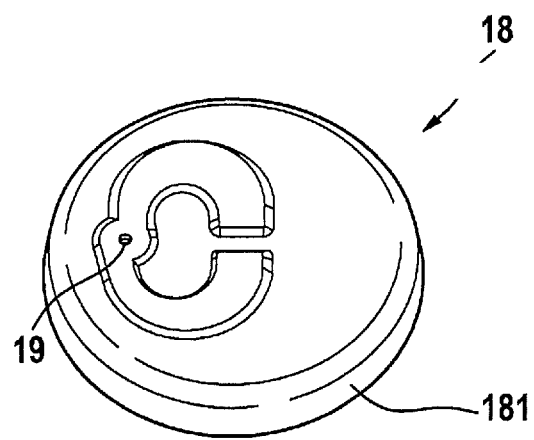
FIG. 9 shows a perspective illustration of a bottom view onto the spray orifice disk in the direction of arrow IX in FIG. 7.

Spray orifice disk 18 shown in FIGS. 7 through 9 is a so-called single-orifice variant of spray orifice disk 18 for particularly small static flow rates of the fluid. Single spray orifice 19 in spray orifice disk 18 is situated at a radial distance from valve opening 14 formed in valve-seat member 12, and two identically designed, curved swirl channels 21, which are situated laterally reversed from each other in spray orifice disk 18, are led to swirl chamber 20 surrounding spray orifice 19. Once again, each of the two swirl ducts 21 has an inflow region 211 leading away from valve opening 14, whose duct width tapers in the flow direction of the fluid, and an incident flow region 212 tangentially opens into swirl chamber 20, whose duct with is largely constant. The ends of inflow regions 211 are again covered by valve opening 14. As spray orifice disk 18 in FIGS. 1 through 3, spray orifice disk 18 is equipped with an annular land 181 which is integrally formed in one piece, with the aid of which spray orifice disk 18 is fixed to valve-seat member 12, e.g., with the aid of weld seam 25.

The fluid exiting valve opening 14 under pressure in a metered manner is impressed with a swirl as it passes through swirl duct 21, swirl chamber 20 and spray orifice 19, this swirl causing atomization of the fluid exiting the at least one spray orifice 19, the spray representing a spray lobe or a spray cone having a plurality of spray lamellae or individual jets which have variably large spray angles relative to the lobe or cone axis. For the preferred fields of application of the valve presented here, namely the metered injection of fuel into the intake manifold system, or of urea-water solutions into the exhaust tract of internal combustion engines, or of heating oil into the burning chamber of a heating system, on the one hand very good atomization is desired, and on the other hand small spray angles of the spray lamellae, i.e., a small cone angle of the spray cone, are required. High swirl intensity yields good atomization, but also relatively large spray angles. To optimize the swirl intensity to the effect that it is as small as possible for the purpose of generating small spray angles, and as large as necessary for the purpose of obtaining a high atomization quality, the designs of swirl duct 21, swirl chamber 20 and spray orifice 19 in spray orifice disk 18 are matched to each other. Initially, swirl duct 21 has such a duct cross section, and spray orifice 19 has such an orifice cross section, that the ratio of the duct cross section to the orifice cross section is equal to or greater than 1.5. The duct cross section is thus relatively large. Furthermore, the chamber depth and chamber diameter of swirl chamber 20 are such that the ratio of the chamber depth to the chamber diameter is 0.2 at a minimum and 0.6 at a maximum. Swirl chamber 20 is thus relatively short. In addition or as an alternative thereto, the orifice length and orifice diameter of spray orifice 19 are such that the ratio of the orifice length to the orifice diameter is 0.2 at a minimum and 0.6 at a maximum. Spray orifice 19 is thus relatively short. It is further preferred on swirl duct 21, which has an outer duct wall tangentially guided to the chamber wall of swirl chamber 20 at least in incident flow region 212 and an inner duct wall located opposite thereof, when the inner duct wall is positioned at such a distance from the outer duct wall that an imaginary vanishing line to the inner duct wall leads through spray orifice 19.

What is claimed is:

1. A metering valve for a flowing fluid, wherein the metering valve is configured as an injector for an internal combustion engine, comprising:
    a valve-seat member which closes a valve chamber, wherein a valve opening is formed in the valve-seat member; and
    a spray orifice disk positioned downstream from the valve-seat member in the flow direction of the fluid, the spray orifice disk having at least one spray orifice, a swirl chamber which is concentric with the spray orifice and at least one swirl duct leading from the swirl chamber to beneath the valve opening, wherein the swirl chamber and the swirl duct are integrally formed as recesses into the disk surface of the spray orifice disk facing the valve-seat member, and wherein the swirl duct has a duct cross section and the spray orifice has an orifice cross section which are dimensioned in such a way that the ratio of the duct cross section to the orifice cross section is equal to or greater than 1.5,
    wherein the swirl duct has an inflow region leading away from the valve opening and an incident flow region opening into the swirl chamber, the incident flow region is situated in such a way that the fluid flows tangentially into the swirl chamber,
    wherein a single spray orifice is present, which is situated at a radial distance from the valve opening, and wherein two curved swirl ducts are guided to the swirl chamber of the single spray orifice, the two curved swirl ducts being situated laterally reversed from each other.

2. The valve as recited in claim 1, wherein the swirl chamber has a chamber diameter and an axial chamber depth which are dimensioned in such a way that the ratio of the chamber depth to the chamber diameter is in a value range having a lower limiting value of 0.2 and an upper limiting value of 0.6.

3. The valve as recited in claim 2, wherein the spray orifice has an orifice length and an orifice diameter which are dimensioned in such a way that the ratio of the orifice length to the orifice diameter is in a value range having a lower limiting value of 0.2 and an upper limiting value of 0.6.

4. The valve as recited in claim 2, wherein the valve-seat member has a flat outer surface facing away from the valve chamber, and the spray orifice disk rests directly against the outer surface of the valve-seat member.

5. The valve as recited in claim 4, wherein an annular wall is integrally molded on the spray orifice disk in one piece and extends circumferentially at the edge over the valve-seat member.

6. The valve as recited in claim 2, wherein the valve-seat member has an outer surface facing away from the valve chamber, and a compensating disk is situated between the spray orifice disk and the outer surface of the valve-seat member, the compensating disk having (i) a flat disk surface resting in a planar manner against the spray orifice disk and (ii) a central hole which is coaxial with the valve opening.

7. The valve as recited in claim 2, wherein the spray orifice disk has a disk thickness ranging from 0.15 mm to 0.25 mm.

8. The valve as recited in claim 2, wherein the swirl chamber and the swirl duct are integrally formed into the spray orifice disk one of (i) with the aid of embossing or (ii) by material ablation with the aid of one of spark erosion, etching or ultrashort laser pulses.

9. The valve as recited in claim 1, wherein the width of the swirl duct (i) tapers in the inflow region in the flow direction of the fluid and (ii) is at least approximately constant in the incident flow region.

10. The valve as recited in claim 1, wherein the swirl duct has (i) an outer duct side wall at least in the incident flow region, which is tangentially guided to the wall of the swirl chamber, and (ii) an inner duct side wall located at a distance opposite the outer duct side wall such that an imaginary vanishing line of the inner duct side wall extends through the spray orifice.

11. The valve as recited in claim 1, wherein the at least one spray orifice has a cylindrical shape.

12. The valve as recited in claim 1, wherein the at least one spray orifice has a truncated cone shape with an increasing cross section in the flow direction.

13. The valve as recited in claim 1, wherein the at least one spray orifice has a spray orifice axis extending one of at a right angle or at an acute angle to the disk surface of the spray orifice disk.

14. The valve as recited in claim 1, wherein the valve-seat member, together with the spray orifice disk which is attached to the valve-seat member, is inserted into and fixedly connected to the open end of a sleeve-shaped valve seat support.

\* \* \* \* \*